United States Patent Office 3,573,078
Patented Mar. 30, 1971

3,573,078
GLASS COMPOSITIONS WITH A HIGH MODULUS OF ELASTICITY
James F. Bacon, Manchester, Conn., assignor to United Aircraft Corporation, East Hartford, Conn.
No Drawing. Filed Nov. 16, 1967, Ser. No. 683,465
Int. Cl. C03c *13/00, 3/04*
U.S. Cl. 106—52          11 Claims

ABSTRACT OF THE DISCLOSURE

Glass compositions comprising silica, alumina, and magnesia plus substantial quantities of an uncommon oxide such as lanthana, ceria, and yttria provide a formulation containing no toxic elements and capable of fiberization to produce filaments having a high modulus of elasticity.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

This invention in general relates to glass and glass compositions, particularly those having a liquidus-viscosity relationship suitable for fiberization and containing no toxic elements.

Glass fibers currently find wide utility in a number of industries in applications wherein they are employed as the reinforcement in composite structures ranging from high strength missile cases and helicopter blades to propeller spinners and gas turbine engine parts. The concept of fiber-strengthening is based on the fact that materials produced in fibrous form frequently exhibit higher strengths than the corresponding materials in bulk form. The strong fibers are utilized with a variety of matrix materials including those displaying less favorable strength characteristics, to provide a composite structure inheriting the favorable physical properties of both materials.

Of particular current interest in certain applications are those filaments characterized not only by high strength but also by a high modulus of elasticity which, when embedded in a suitable matrix material, offer the potential of significant improvements in the modulus of the composite structure. There are materials, such as boron fiber, which offer excellent strength and modulus characteristics as well as good high temperature properties and an excellent modulus-density ratio. However, boron fiber is relatively unavailable and, even when available, it is expensive. Furthermore, boron is extremely reactive and, hence, prone to detrimental oxidation and significant interactions with many of the preferred matrix materials.

Glass fibers offer promise as the strengtheners in applications such as those mentioned above, since they may be quickly and cheaply produced by relatively conventional techniques and, generally, they present no compatability problems with the matrix materials with which they are normally used. There is a need, however, to provide glass formulations which possess a high modulus of elasticity, and more particularly a high modulus-density ratio, together with an appropriate liquidus-viscosity relationship to permit fiberization. Furthermore, in most commercial applications, it is important that the glasses contain no toxic elements which may present complications either in their manufacture as filaments or in their use.

There are a number of high modulus glasses known in the art as evidenced by the patents to Provance 3,044,888 and Tiede 3,127,277. It will be noted, however, that these glasses often include substantial quantities of toxic materials such as beryllia.

SUMMARY OF THE INVENTION

The glass compositions of the present invention comprise silica, alumina and magnesia together with at least 5% by weight of one or more uncommon oxides such as lanthana, ceria, or yttria. In some cases certain other glass forming ingredients may be included in the formulation either in the nature of partial substitutions or as additions to the basic elements.

The glass compositions may, in general, be characterized in greater detail as follows:

GROUP 1

| Ingredient: | Percent by weight |
|---|---|
| $SiO_2$ | 20–60 |
| $La_2O_3$ | 2–55 |
| $Al_2O_3$ | 3–45 |
| MgO | 6–40 |
| CaO | 0–18 |
| $ZrO_2$ | 0–17 |
| $Y_2O_3$ | 0–35 |
| $Ce_2O_3$ | 0–35 |

GROUP 2

| Ingredient: | Percent by weight |
|---|---|
| $SiO_2$ | 25–60 |
| $Ce_2O_3$ | 2–60 |
| $Al_2O_3$ | 3–45 |
| MgO | 6–40 |
| CaO | 0–18 |
| $ZrO_2$ | 0–17 |
| $Y_2O_3$ | 0–35 |

GROUP 3

| Ingredient: | Percent by weight |
|---|---|
| $SiO_2$ | 25–60 |
| $Y_2O_3$ | 2–65 |
| $Al_2O_3$ | 3–45 |
| MgO | 6–40 |
| CaO | 0–18 |
| $ZrO_2$ | 0–17 |
| $Ce_2O_3$ | 0–58 |

An important feature of the glasses of the present invention is that they may be readily made into fibers having a high modulus of elasticity.

Another feature of these glasses is that they contain no toxic ingredients but are characterized by a liquidus-viscosity relationship suitable for fiberization.

A further feature is that they may be formed into filaments having a high modulus-density ratio while maintaining substantially all of the other favorable physical properties desired in glasses of this type.

These and other features of the invention will be discussed in greater detail in the description which follows or will be evident therefrom to those skilled in the art.

DESCRIPTION OF THE PREFERRED EMBODIMENTS

In a generic sense, the glasses of the present invention may be characterized as of the cordierite variety ($Mg_2Al_4Si_5O_{18}$—a three-dimensional ring-former), but with the addition of substantial amounts of the uncommon oxides, selected from the group consisting of lanthana, ceria and yttria, this addition in some instances being so large as to equal or exceed the contributed weight of the cordierite components. Modifying additions are also disclosed including materials such as zirconia to improve the modulus and calcia.

In their more preferred formulations, the present glasses will be generally constituted as follows:

GROUP 1

| Ingredient: | Percent by weight |
|---|---|
| $SiO_2$ | 27–52 |
| $La_2O_3$ | 5–55 |
| $Al_2O_3$ | 8–30 |
| MgO | 6–22 |
| CaO | 0–14 |
| $ZrO_2$ | 0–5 |
| $Y_2O_3$ | 0–25 |
| $Ce_2O_3$ | 0–27 | the total uncommon oxide content of the composition not exceeding about 55 percent by weight.

GROUP 2

| Ingredient: | Percent by weight |
|---|---|
| $SiO_2$ | 27–52 |
| $Ce_2O_3$ | 5–60 |
| $Al_2O_3$ | 8–30 |
| MgO | 6–22 |
| CaO | 0–14 |
| $ZrO_2$ | 0–5 |
| $Y_2O_3$ | 0–25 | the total uncommon oxide content of the composition not exceeding about 60 percent by weight.

GROUP 3

| Ingredient: | Percent by weight |
|---|---|
| $SiO_2$ | 27–52 |
| $Y_2O_3$ | 5–40 |
| $Al_2O_3$ | 8–30 |
| MgO | 6–22 |
| CaO | 0–14 |
| $ZrO_2$ | 0–5 |
| $Ce_2O_3$ | 0–27 | the total uncommon oxide composition not exceeding about 40 percent by weight.

Several specific formulations appear particularly advantageous including:

In Group 1:

GLASS NO. 137

| Ingredient: | Percent by weight |
|---|---|
| $SiO_2$ | 44.6 |
| $La_2O_3$ | 17.8 |
| $Al_2O_3$ | 21.6 |
| MgO | 16.0 |

In Group 2:

GLASS NO. 40

| Ingredient: | Percent by weight |
|---|---|
| $SiO_2$ | 40.7 |
| $Ce_2O_3$ | 17.1 |
| $Al_2O_3$ | 24.6 |
| MgO | 17.6 |

GLASS NO. 73

| Ingredient: | Percent by weight |
|---|---|
| $SiO_2$ | 50.0 |
| $Ce_2O_3$ | 12.5 |
| $Al_2O_3$ | 12.5 |
| MgO | 15.0 |
| $Y_2O_3$ | 10.0 |

In Group 3:

GLASS NO. 129

| Ingredient: | Percent by weight |
|---|---|
| $SiO_2$ | 38.6 |
| $Y_2O_3$ | 29.1 |
| $Al_2O_3$ | 17.5 |
| MgO | 14.8 |

GLASS NO. 126

| Ingredient: | Percent by weight |
|---|---|
| SiO | 33.1 |
| $Y_2O_3$ | 35.4 |
| $Al_2O_3$ | 25.5 |
| MgO | 6.0 |

In the preliminary work only pure materials, particularly those of lanthana, ceria and yttria, were utilized so that the characterization and property data could be unequivocally interpreted. In later experiments much less costly and impure formulations were substituted, such as would be used in actual glass making operations. The normal impurities found in the less pure starting materials, including some of the less common rare earths, have been found to exert no significant detrimental effect on the properties of the desired end product when present in the normal amounts.

With respect to the form of the materials added, it has been the practice to add the uncommon oxide as the oxalate, the other materials being added as the oxide. Any form of the addition is satisfactory, however, as long as it is reducible in the melt to the oxide. And the addition of the ingredients in a form which provides some gas evolution during melting furnishes an advantageous stirring effect in the melt.

The desired glasses are capable of fiberization which is the ability of the glass to be readily drawn into filamentary form. In general, therefore, the glasses over a reasonable temperature range, depending on the particular composition, will display a viscosity of about 10–20,000 poises, the optimum viscosity being about 300–1000 poises.

Typically, the glasses were prepared in 500 gram batches in high purity (99.9% alumina crucible in a Super-Kanthal hairpin kiln. The starting materials were 5 micron particles size high purity silica, 325 mesh high purity alumina, high purity precipitated magnesia, and lanthanum, yttrium and/or cerium oxalates of 99% purity. The ingredients were completely mixed dry by tumbling, and briquetted for ease of handling. The yield in general is a water-white optical grade glass free of seed and bubbles due to the fining action of the oxalates when held at a temperature of 1540° C. or higher for two hours. With the above-mentioned preparation technique alumina crucibles of even slightly lower purity (99.3-99.7%) cannot be used, nor can the temperature of about 1540–1560° C. be exceeded even with the alumina crucibles of highest purity. The more refractory glasses were melted in either platinum alloy crucibles, or in tungsten crucibles under argon cover.

Viscosity measurements of the molten oxides were made with a Brookfield Synchro-Electric Viscometer wherein a disc is rotated in the melt through a beryllium-copper spring, the spring deflection indicating relative viscosity. For the high temperature work a tungsten spindle and shaft extension were utilized.

The compositions of some of the representative glasses formulated and fiberized in the course of the experimental program are set forth in Table I.

TABLE I.—COMPOSITIONS OF REPRESENTATIVE GLASSES
[Weight percent]

| Glass No. | $SiO_2$ | $Al_2O_3$ | MgO | CaO | $La_2O_3$ | $Ce_2O_3$ | $Y_2O_3$ |
|---|---|---|---|---|---|---|---|
| 124 | 20.9 | 19.2 | 5.3 | | 54.6 | | |
| 135 | 51.5 | 25.1 | 18.3 | | 5.1 | | |
| 136 | 48.5 | 24.0 | 17.6 | | 9.9 | | |
| 137 | 44.6 | 21.7 | 16.0 | | 17.7 | | |
| 138 | 34.6 | 19.4 | 14.2 | | 31.8 | | |
| 139 | 22.9 | 15.4 | 11.3 | | 50.4 | | |
| 140 | 33.4 | 18.7 | 13.3 | | 30.7 | 3.9 | |
| 141 | 21.7 | 14.6 | 9.9 | | 47.8 | 6.0 | |
| 40 | 40.7 | 24.6 | 17.6 | | | 17.1 | |
| 62 | 51.6 | 25.0 | 18.3 | | | 5.1 | |
| 72 | 50.0 | 22.5 | 15.0 | | | 12.5 | |
| 73 | 50.0 | 12.5 | 15.0 | | | 12.5 | 10.0 |
| 113 | 33.3 | 24.6 | 6.8 | | | 35.2 | |
| 117 | 27.2 | 8.4 | 6.8 | | | 57.6 | |
| 121 | 20.8 | 19.2 | 5.3 | | | 54.7 | |
| 64 | 51.7 | 25.0 | 18.3 | | | | 5.0 |
| 70 | 51.7 | 20.0 | 18.3 | | | | 10.0 |
| 73.2 | 50.0 | 12.5 | 15.0 | | | 12.5 | 10.0 |
| 114 | 37.4 | 27.6 | 7.8 | | | | 27.2 |
| 116 | 27.4 | 27.7 | 8.1 | | | | 36.8 |
| 126 | 33.1 | 25.5 | 6.0 | | | | 35.4 |
| 129 | 38.6 | 17.5 | 14.8 | | | | 29.1 |
| 130 | 45.0 | 12.6 | 14.4 | | | | 28.0 |
| 133 | 45.9 | 13.0 | 5.2 | 7.2 | | | 28.7 |
| 142 | 31.7 | 17.5 | 3.7 | 16.3 | | 3.9 | 26.6 |

Many of the experimental glasses have a steeper temperature viscosity curve than the typical "hard" glasses. Successful fiber formation from such glasses demand precise temperature control, care in sizing the orifice through which the glass is drawn, and variable speed drawing equipment. All of the glasses described have, however, been successfully fiberized.

In order to evaluate the glass forming characteristics and fiberizability of the various glasses, oxide materials previously melted in standard kilns were used as the starting materials. From the previous firing they are available either as fully melted glasses, glass or crystalline masses, or substances with the appearance of clinkers. A sufficient amount of material in each case was crushed to about 10 mesh size and used to fill a 15 milliliter platinum crucible. The crucible was inserted into a preheated furnace; heated to the desired temperature providing the optimum viscosity for drawing; and held at temperature for ½–2 hours, depending on the particular glass. After quickly removing the crucible from the furnace, a twenty mil platinum wire was dipped into a melt and rapidly removed from the crucible. In this manner it was usually possible to hand draw a glass fiber 2–5 mils in diameter and 30–40 feet long. Those glasses which readily yielded long hand-drawn fibers in this test or, alternatively, which formed vitreous buttons when dropped on a graphite slab, were selected for further evaluation.

While the hand-drawing technique proved to be of value in the initial screening of compositions, it was evident that, no matter how carefully the hand-drawn fibers were prepared, they tended to exhibit a distorted cross-section. The distortion was normally sufficient to make it impossible to obtain a meaningful value for the average cross-section of such fibers which in turn made the values of Young's modulus (E), deduced by dead-weight mechanical testing procedures, extremely erratic and unreliable.

In view of the foregoing, the property evaluation of the fibers was performed on mechanically-drawn fibers. For this purpose a platinum crucible was adapted to make possible mechanical drawing by forming a tapered orifice therein, 0.088 of an inch at the top, 0.063 of an inch at the bottom, and 3/16 of an inch long. Water cooling and helium impingement immediately below the orifice were included. This equipment proved to yield glass fiber very close to circular in cross-section and approximately 1 mil in diameter at drawing speeds of about 4000 feet/minute.

Table II lists the values of Young's modulus for a number of the glasses made and tested in accordance with the teachings herein. For the purposes of comparison Glass Melt 82–2 was made in accordance with the teachings of U.S. Pat. No. 3,044,888 and Melt 83–1 as described in U.S. Pat. No. 3,127,277.

TABLE II.—GLASS FIBER CHARACTERISTICS

| Glass No. | Density, gms./cm.$^3$ | E (dynamic), p.s.i.$\times 10^6$ | E static), (p.s.i.$\times 10^6$ (over 20 tests) | E (average), p.s.i.$\times 10^6$ |
|---|---|---|---|---|
| 82 [1] | 2.588 | 16.1 | 13.3 | |
| 83 [2] | 1.838 | 17.1 | 15.0 | |
| 124 | | 17.1 | 15.0 | |
| 135 | 2.63 | 14.2 | 13.3 | |
| 136 | 2.80 | 14.8 | 13.5 | |
| 137 | 3.08 | 16.2 | 13.9 | |
| 138 | 3.55 | 16.2 | | 16.5 |
| 140 | | | 15.0 | |
| 40 | 2.96 | 13.8 | 16.2 | |
| 62 | 2.70 | 15.3 | 14.0 | |
| 72 | 2.89 | 15.2 | 12.5 | |
| 73 | 3.02 | 15.7 | 15.1 | |
| 117 | | | | 16.5 |
| 64 | | 13.7 | 14.7 | |
| 70 | 2.75 | 16.2 | 13.5 | |
| 73–2 | 3.02 | 15.7 | 15.1 | |
| 114 | 3.22 | 18.1 | 15.1 | |
| 126 | 3.46 | 17.7 | 16.2 | |
| 129 | 3.31 | 18.1 | 16.5 | |

[1] As per Provance 3,044,888.
[2] As per Tiede 3,127,277.

All of the glasses were prepared, drawn into fibers, and tested in identical fashion so that the comparative data of the table should be highly reliable for, even if the absolute numbers assigned to the values of Young's modulus be in error, the error would be reflected as a constant multiple.

The first method of measuring Young's modulus utilized a Dynamic Modulus Tester PPM–5R manufactured by H. M. Morgan Co., Inc., Cambridge, Mass. It functions by measuring the velocity of a longitudinal sound wave in a lightly loaded fiber sample. This method of testing is independent of the fiber diameter and depends only upon the longitudinal sound velocity and the density. Densities were established by flotation techniques.

An alternative method of determining Young's modulus involved a dead-load stress-strain procedure in which the displacements of two points of the test fiber is obtained utilizing linear variable differential transformers. Carefully conducted comparisons showed good correlation in the modulus values obtained by the two methods.

Several of the formulations have proved to display modulus/density ratios superior to the best of the glass compositions given in the literature yet without the inclusion of any toxic ingredients. The particular formulation selected in a given application, however, will be dependent, usually, not only upon the properties of the end product but also upon the cost of the ingredients included. This is particularly true in high volume commercial production. For this reason, although a measure of experimentation was performed utilizing some of the rare-earth oxides, such as samaria, these other oxides will normally not be adapted to practical utilization because of their cost. As previously indicated, however, their inclusion in the melt as a result of their presence as incidental impurities in the materials utilized has no detrimental effect on the end product.

Of the species disclosed, the lanthana and ceria glasses appear to be more similar to one another than the yttria glasses. Since the lanthana and ceria are found in roughly the same size module and approach each other in terms of molecular weight, the end product in terms of the modulus/density ratio is similar. Moreover, the lanthana and ceria glasses appear somewhat more dependent upon this inclusion of alumina in the melt than do the yttria containing glasses. All three types of glasses achieve the more preferred results in the presence of magnesia, however. In the case of the yttria glasses, a better modulus/density ratio is usually achieved because of the low molecular weight of yttria, at the price of increased cost however.

A number of other materials have been added to the various experimental glasses in the course of the program including such compounds as calcia (in the form of calcium carbonate), zirconia, titania (not rutile), barium and strontium carbonate, and other materials, with the expected result. While the invention has been described in connection with a number of particular preferred embodiments, they are considered illustrative only, and no limitation is intended thereby. Numerous substitutions, alterations and modifications will be evident to those skilled in the art within the true spirit and scope of the invention as set forth in the appended claims.

What is claimed is:

1. A high modulus glass composition which consists essentially of:

| Ingredient: | Percent by weight |
| --- | --- |
| $SiO_2$ | 20–60 |
| $La_2O_3$ | 2–55 |
| $Al_2O_3$ | 3–45 |
| $MgO$ | 6–40 |
| $CaO$ | 0–18 |
| $ZrO_2$ | 0–17 |
| $Y_2O_3$ | 0–35 |
| $Ce_2O_3$ | 0–35 | the total content of the oxides $La_2O_3$, $Y_2O_3$ and $Ce_2O_3$ comprising at least 5 percent but not exceeding about 60 percent by weight.

2. A high modulus glass composition which consists essentially of:

| Ingredient: | Percent by weight |
| --- | --- |
| $SiO_2$ | 27–52 |
| $La_2O_3$ | 5–55 |
| $Al_2O_3$ | 8–30 |
| $MgO$ | 6–22 |
| $CaO$ | 0–14 |
| $ZrO_2$ | 0–5 |
| $Y_2O_3$ | 0–25 |
| $Ce_2O_3$ | 0–27 | the total content of the oxides $La_2O_3$, $Y_2O_3$ and $Ce_2O_3$ not exceeding about 55 percent by weight.

3. A glass composition which consists essentially of about, by weight, 45 percent silica, 20 percent alumina, 15 percent magnesia, balance lanthana.

4. A high modulus glass composition which consists essentially of:

| Ingredient: | Percent by weight |
| --- | --- |
| $SiO_2$ | 25–60 |
| $Ce_2O_3$ | 2–60 |
| $Al_2O_3$ | 3–45 |
| $MgO$ | 6–40 |
| $CaO$ | 0–18 |
| $ZrO_2$ | 0–17 |
| $Y_2O_3$ | 0–35 | the total content of the oxides $Ce_2O_3$ and $Y_2O_3$ comprising at least 5 percent by weight.

5. A high modulus glass composition which consists essentially of:

| Ingredient: | Percent by weight |
| --- | --- |
| $SiO_2$ | 27–52 |
| $Ce_2O_3$ | 5–60 |
| $Al_2O_3$ | 8–30 |
| $MgO$ | 6–22 |
| $CaO$ | 0–14 |
| $ZrO_2$ | 0–5 |
| $Y_2O_3$ | 0–25 | the total content of the oxides $Ce_2O_3$ and $Y_2O_3$ not exceeding about 60 percent by weight.

6. A glass composition which consists essentially of about, by weight, 40 percent silica, 25 percent alumina, 20 percent magnesia, balance ceria.

7. A glass composition which consists essentially of about, by weight, 50 percent silica, 10 percent alumina, 15 percent magnesia, balance ceria and yttria in about equal proportions.

8. A high modulus glass composition which consists essentially of:

| Ingredient: | Percent by weight |
| --- | --- |
| $SiO_2$ | 25–60 |
| $Y_2O_3$ | 2–65 |
| $Al_2O_3$ | 3–45 |
| $MgO$ | 6–40 |
| $CaO$ | 0–18 |
| $ZrO_2$ | 0–17 |
| $Ce_2O_3$ | 0–58 | the total content of the oxides $Y_2O_3$ and $Ce_2O_3$ comprising at least 5 percent by weight.

9. A glass composition which consists essentially of:

| Ingredient: | Percent by weight |
| --- | --- |
| $SiO_2$ | 27–52 |
| $Y_2O_3$ | 5–40 |
| $Al_2O_3$ | 8–30 |
| $MgO$ | 6–22 |
| $CaO$ | 0–14 |
| $ZrO_2$ | 0–5 |
| $Ce_2O_3$ | 0–27 | the total content of the oxides $Y_2O_3$ and $Ce_2O_3$ not exceeding about 40 percent by weight.

10. A glass composition which consists essentially of about, by weight, 40 percent silica, 20 percent alumina, 15 percent magnesia, balance yttria.

11. A glass composition which consists essentially of about, by weight, 35 percent silica, 25 percent alumina, 5 percent magnesia, balance essentially yttria.

References Cited

UNITED STATES PATENTS

| 3,044,888 | 7/1962 | Provance | 106—50 |
| 3,060,041 | 10/1962 | Loewenstein | 106—50 |
| 3,402,055 | 9/1968 | Harris et al. | 106—50 |
| 3,459,568 | 8/1969 | Rinehart | 106—52 |
| 3,459,673 | 8/1969 | Best et al. | 106—52X |

FOREIGN PATENTS

| 196,266 | 5/1967 | Russia | 106—50 |

OTHER REFERENCES

Gates et al.: Ceramic Bulletin 46 (2), February 1967, "Refractory Glass Fibers," pp. 202–205.

HELEN M. McCARTHY, Primary Examiner

U.S. Cl. X.R.

106—50